Nov. 30, 1965 W. B. SEIDEL 3,220,399
TRUING MECHANISM FOR GRINDING MACHINE
Filed March 25, 1963 5 Sheets-Sheet 1

INVENTOR.
WILLIAM B. SEIDEL
BY
Howard Keiser
John F. Verhoeven
ATTORNEYS

Nov. 30, 1965 W. B. SEIDEL 3,220,399
TRUING MECHANISM FOR GRINDING MACHINE
Filed March 25, 1963 5 Sheets-Sheet 3

United States Patent Office

3,220,399
Patented Nov. 30, 1965

3,220,399
TRUING MECHANISM FOR GRINDING MACHINE
William B. Seidel, Cincinnati, Ohio, assignor to The Cincinnati Milling Machine Co., Cincinnati, Ohio, a corporation of Ohio
Filed Mar. 25, 1963, Ser. No. 267,464
3 Claims. (Cl. 125—11)

The present invention relates to a grinding machine truing device particularly suitable for truing narrow grinding wheels.

One difficulty with truing devices which are guided by a cam to produce a profile on a grinding wheel in accordance with the profile of the cam is that a different cam is generally required for each profile desired on the grinding wheel. Moreover, precision arcuate cam profiles are difficult to produce, and any imperfection in the cam surface is reproduced in the profile of the grinding wheel. Truing devices in which a truing tool is, for example, swung along a circular path defined by a radius arm of the device to generate a circular profile on a grinding wheel will generally produce a truer surface on the grinding wheel than can be produced by a cam. While circular profiles of different radii can be generated by a truing device with a single radius arm (by adjustment, for example, of the length of the radius arm), more complex profiles require more complex, and larger, mechanisms. Frequently, a linear slide is used in conjunction with a swinging member to generate a variety of profiles on a grinding wheel, but these mechanisms are large and, if power operated, generally require two separate inputs, one to swing the swinging member and one to move the linear member.

In the present invention a truing device for a grinding machine is provided with which a wide variety of profiles can be generated through a single driving member. The truing device of the present invention, which can be compact for convenient use with narrow wheels, has a truing tool carrier which is selectively swingable by the single driving member about one or the other of two different axes. In the preferred form of the invention, the carrier, and the forming tool carried thereby, is swung about a first axis by the drive member to generate a circular arc of selected radius on the grinding wheel and is swung about a second axis perpendicular to the first axis by the same drive member to generate a substantially straight surface on the wheel. Preferably, means is provided to control the rate of operation of the drive member during the truing cycle in coordination with the movement of the truing tool, to provide a desired rate of movement of the truing tool throughout the cycle.

It is therefore one object of the present invention to provide a truing mechanism and a tool swingable, selectively, about two different axes by a single drive member for producing a wide variety of profiles on a grinding wheel. It is another object of the present invention to provide a compact truing mechanism with a tool swingable, selectively, at predetermined rates, which vary during the truing cycle, about two different transverse axes by a single drive member for producing a wide variety of profiles on a grinding wheel. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

FIGS. 9a, 10a, 11a, and 12a are schematic views (from above) showing a variety of profiles which can be trued on a grinding wheel by the truing device of the present invention;

FIGS. 9b, 10b, 11b, and 12b are schematic views (from below) showing the setting of the stop members to true the profiles shown in FIGS. 9a, 10a, 11a, and 12a, respectively.

Figure 1:
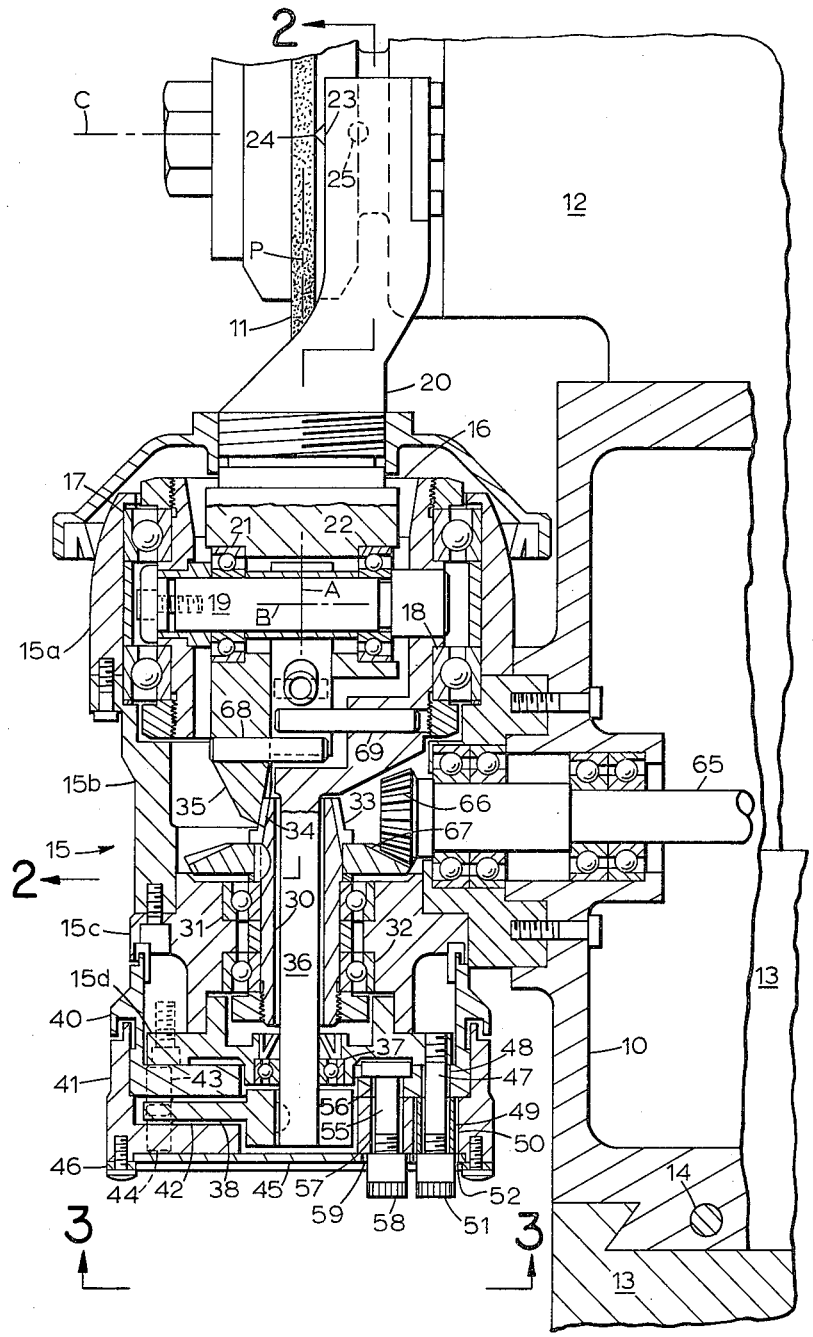
FIG. 1 is a view in cross-section of the truing device of the present invention.

As shown best in FIG. 1, the truing device of the present invention has a housing, indicated generally at 15, which is mounted in support slide 10 adjacent the periphery of a grinding wheel 11. The grinding wheel 11 is carried by wheelhead 12 and is rotatable about an axis C thereon. The wheelhead 12 and support slide 10 are mounted on base 13, and the support slide 10 can be moved thereon toward the grinding wheel by screw 14 to compensate for wheel wear or to effect adjustments for different truing operations. Support slide 10, however, is held stationary on the base 13 during any particular truing operation. The truing device housing 15 comprises the upstanding wall sections (of circular cross-section) 15a, 15b, 15c, and the bottom end section 15d, all secured together. A truing tool carrier support member 16 is mounted in the housing by ball bearings 17, 18, for rotation about the vertical, central axis A of the housing 15 which lies in the central plane P of the grinding wheel. The support member 16 defines a sleeve having a cross shaft 19 on which a truing tool carrier 20 is swingably mounted, by ball bearings 21 and 22, for rocking movement about the transverse, horizontal axis B of the shaft 19. The upper end of the tool carrier 20, which extends above the housing 15, is offset from the vertical axis A and has a truing tool 23 terminating in a diamond cutting point 24 adjustably secured therein by set screw 25.

A hollow drive shaft 30 is rotatably mounted, by ball bearings 31 and 32, in the housing 15 on vertical axis A. Drive shaft 30 terminates, at its upper end, in a bevel drive gear 33 which is continuously engaged with a segmental bevel gear 34 (having the center of its pitch circle on axis B) carried at the lower end of a depending portion 35 of the truing tool carrier 20. The carrier support member 16 has a depending vertical shaft portion 36, extending through the hollow drive member defined by shaft 30 and gear 33 with clearance. Shaft portion 36 is supported in housing bearing 37 below shaft 30 and has a horizontal arm 38 keyed thereto at its lower end.

Figure 5:
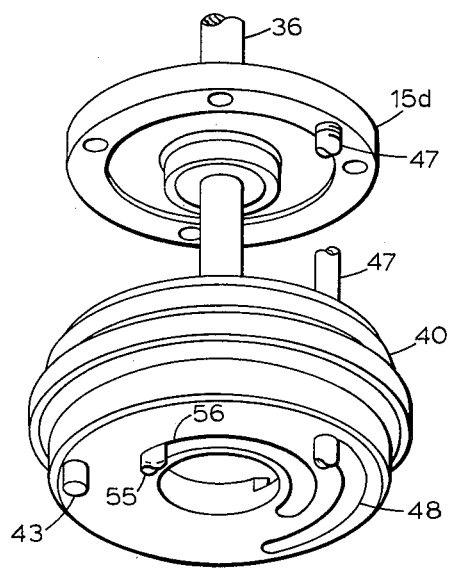
FIG. 5 is an exploded view of members assembled on the lower end of the truing tool carrier housing.
Figure 5:
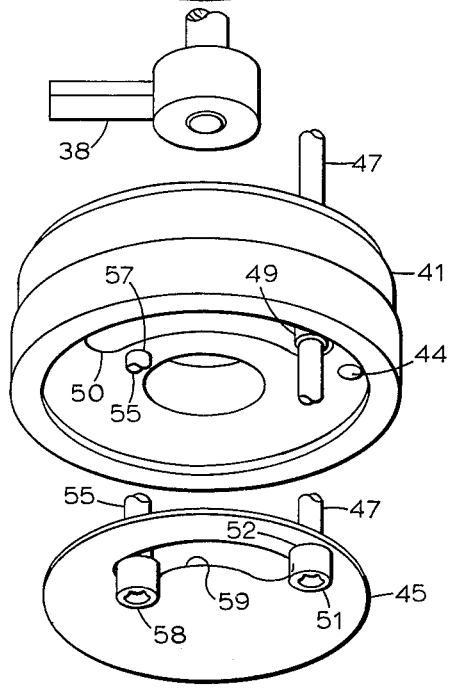

An upper cup member 40 is received over the housing end section 15d, and a lower cup member 41 is received over the upper cup member 40, the cup members defining a recess 42 therebetween in which the horizontal arm 38 is received. As shown best in FIGS. 1 and 5 (the latter of which is an exploded view of the assembly of the cup members) the upper cup member 40 has a depending stop pin 43 secured therein and the lower cup member 41 has an upstanding stop pin 44 secured therein, both stop pins (shown in different angular positions in FIGS. 1 and 5 for clarity) lying in the path of the horizontal arm 38. A lower plate 45 is held loosely in the lower cup member 41 by a ring 46 so that plate 45 is rotatable relative to the lower cup member. A tie rod 47 is secured in bottom end section 15d and extends down through arcuate slot 48 in upper cup member 40 and through a spacer 49 below the upper cup member 40. Spacer 49 extends through arcuate slot 50 in lower cup member 41, and a cap 51, threadedly received on the rod 47, extends through a hole 52 in lower plate 45. When cap 51 is tightened, the upper cup member 40 is clamped between housing end section 15d and spacer 49, thus holding the stop pin 43 in a selected angular position relative to axis A.

Even with the upper cup member 40 clamped, and upper stop pin 43 locked in positon, the lower stop pin 44 carried by the lower cup member 41 can be adjusted to a selected angular position around axis A. A tie rod 55, which has a head resting in the upper cup member 40, extends down through arcuate slot 56 in the upper cup member and through a hole 57 in the lower cup member. A cap 58, received in arcuate slot 59 in lower plate 45, is threadedly received on tie rod 55 and, when tightened thereon, clamps the lower cup member 41 to the upper cup member 40 to lock the stop pin 44 in a selected angular position when the upper cup member 40 is clamped.

Figure 2:
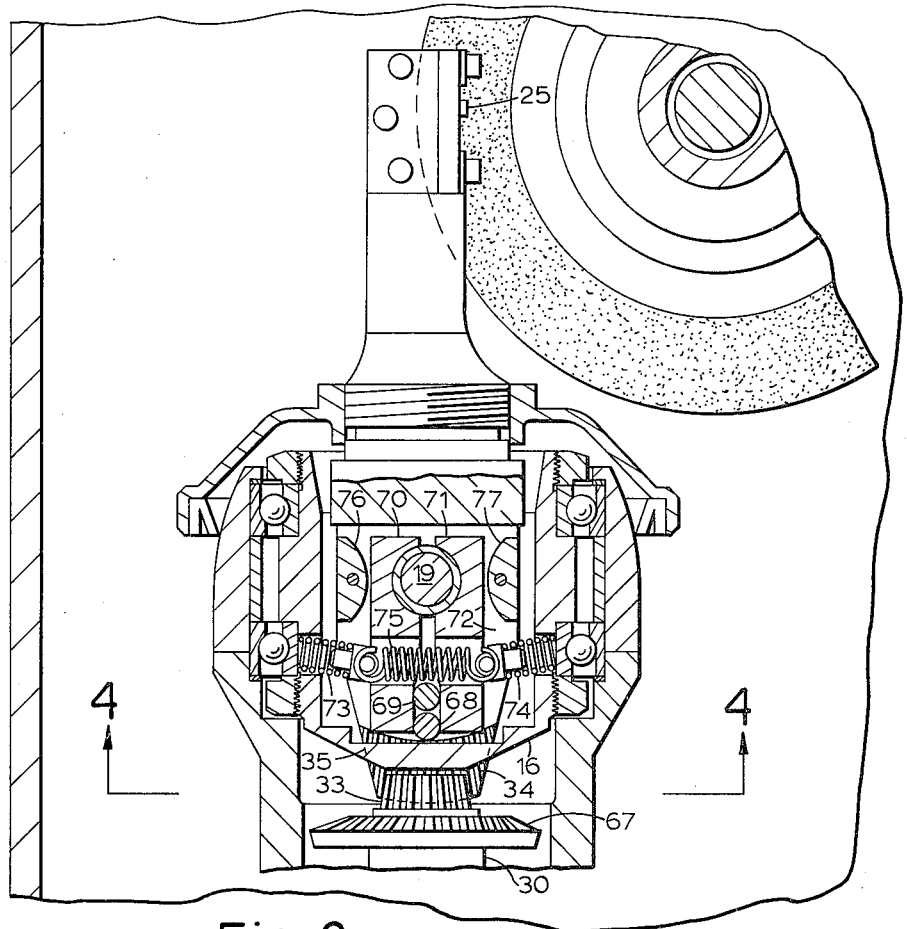
FIG. 2 is a view taken on the line 2—2 of FIG. 1.
Figure 3:
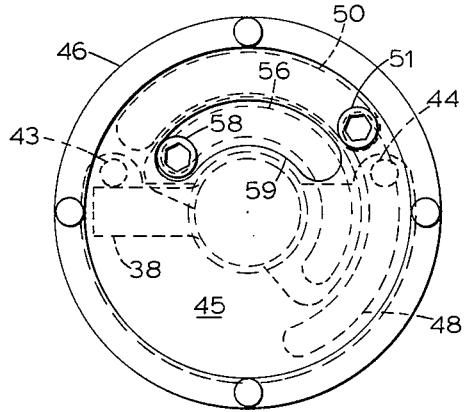
FIG. 3 is a view taken on the line 3—3 of FIG. 1 with certain members shown in a different angular position than in FIG. 1 for clarity.
Figure 4:
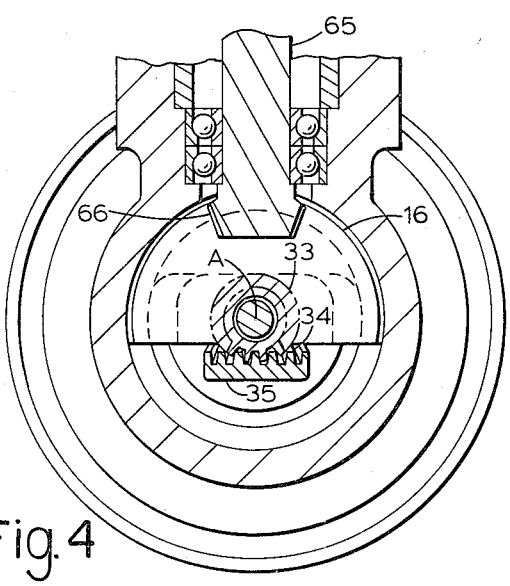
FIG. 4 is a view taken on the line 4—4 of FIG. 2.
Figure 9A:
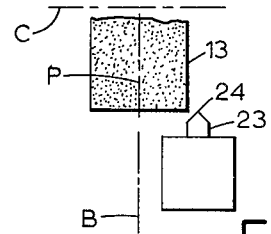
Figure 9B:
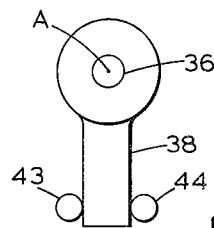

Power is transmitted to the truing mechanism drive shaft 30 through a horizontal shaft 65 terminating in a bevel gear 66, and through a meshing bevel gear 67 keyed to the drive shaft 30. Normally, the truing tool carrier 20 is urged to a vertical positon in support sleeve 16 with depending portion 35 vertical, and segmental bevel gear 34 centered with respect to bevel gear 33 as shown in FIG. 4. This is accomplished by two pins 68 and 69, one pin 68 carried in the depending portion 35 of the tool carrier 20 and the other pin 69 carried in the support sleeve 16. A pair of blocks 70, 71, received in slot 72 in carrier 20 as shown in FIG. 2, straddle cross shaft 19 and the two pins 68 and 69. The blocks 70, 71 are urged together by compression springs 73, 74 and tension spring 75, thereby urging the pins 68, 69 into alignment to hold the truing tool carrier 20 vertical. Stop blocks 76, 77 are secured in the slot to allow only limited displacement of the blocks from the position shown.

Figure 8:
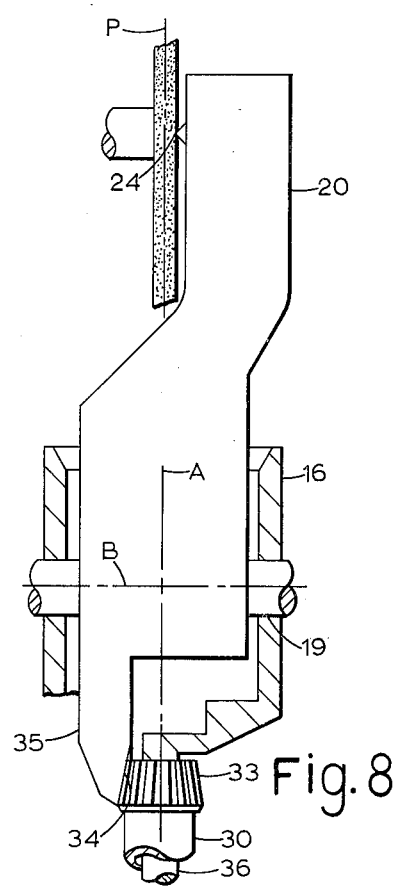
FIG. 8 is a somewhat schematic view of the truing device taken as the view of FIG. 1.

As can best be seen from FIG. 1 and the simplified showing of FIG. 8, if the arm 38, connected to the depending portion 36 of the carrier support sleeve 16, is unrestrained by the stop pins 43, 44, the support member 16 will rotate about axis A in response to rotation of drive shaft 30 since the teeth of segmental bevel gear 34 engage the teeth of drive gear 33 at a point spaced from the common axis A of the drive gear and the support sleeve. The tool carrier 20 will also rotate about axis A, moving the truing tool point in a circular arc about axis A since the tool carrier is biased to a predetermined, vertical, position, in the support sleeve 16. No relative movement between gear 33 and 34 will occur. The rotation of support sleeve 16 about axis A, which can occur in either direction since shaft 65, and hence drive shaft 30, can be rotated in either direction, will be terminated when arm 38 engages either stop pin 43 or 44. If drive shaft 30 continues to rotate in the same direction that moved arm 38 against a stop, the gear 34 is driven about axis B, rocking the carrier 20, and the depending portion 35 thereof, about axis B. At the same time the diamond point 24 is swung in a circular arc about axis B. In this rocking movement, the pin 68 overcomes the resistance of springs 73, 74, and 75 to displace one of the blocks 70, 71 from the position shown in FIG. 2. Thus the diamond point 24 is, while arm 38 is unrestrained, initially driven in a horizontal circular arc having a center on axis A, and then, after arm 38 is stopped, swung in a vertical circular arc having a center on axis B.

Figure 6:
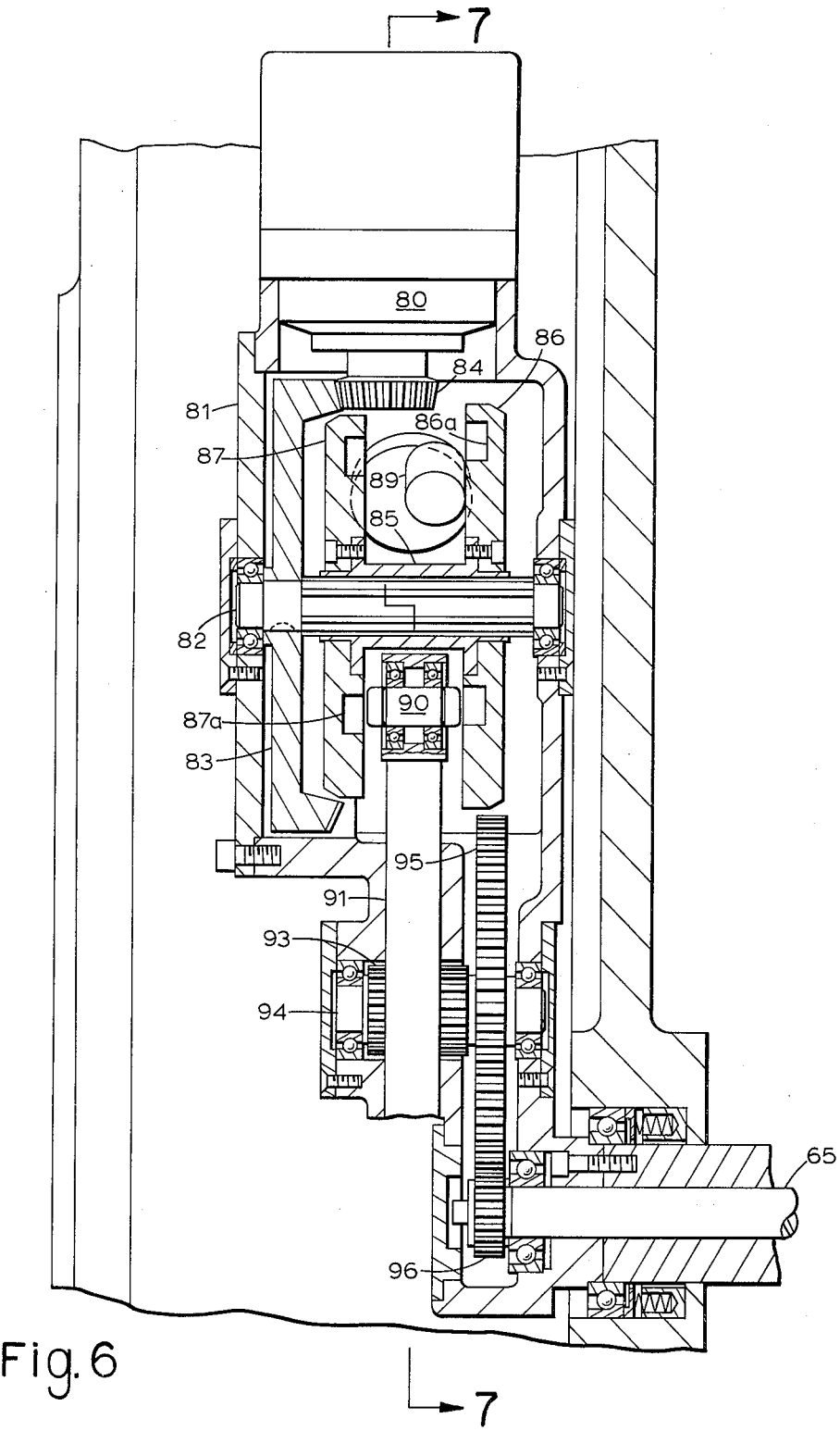
FIG. 6 is a top view of part of the drive mechanism.
Figure 7:
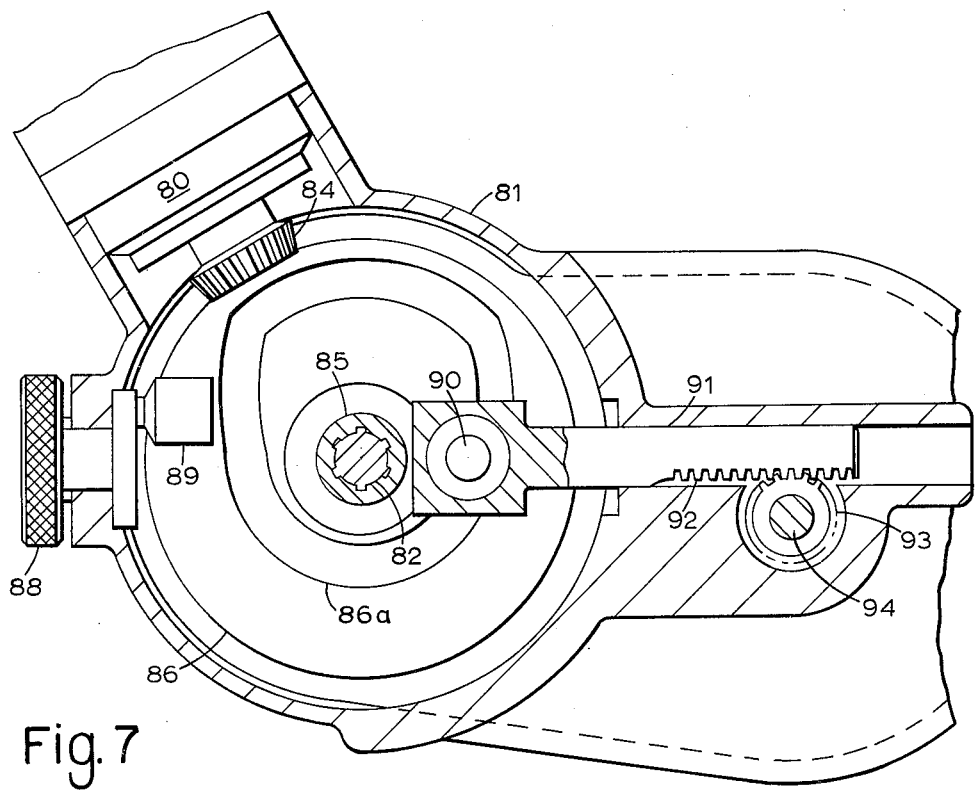
FIG. 7 is a view taken on the line 7—7 of FIG. 6.
Figure 10A:
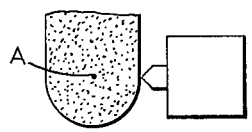

Power to drive shaft 65 in one direction or the other is provided by constant speed, electric motor 80 which is secured in a housing 81, as shown in FIGS. 6 and 7. A spline shaft 82 is journaled in the housing 81 and connected to the motor 80 for rotation thereby through a bevel gear 83 keyed to shaft 82 and a meshing bevel bear 84 carried by the motor shaft. Shaft 82 carries a cam member 85 comprising a pair of interconnected cams 86, 87 spaced a fixed distance apart, each having a cam track 86a, 87a, respectively encircling shaft 82. The axial positioning of cam member 85 is set, to render either one or the other of the cams 86, 87 effective for a particular truing operation, by a knob 88 (see FIG. 7) connected to an eccentric pin 89 received between the cams 86, 87. By means of the knob 88 the cam member 85 is shifted either to the right or left of the position shown in FIG. 6 so that stud 90 is engaged either with track 86a in cam 86 or track 87a in cam 87.

Stud 90 is rotatably carried at one end of a rack plunger 91, the rack 92 of which is engaged with pinion 93. Pinion 93 is carried by a shaft 94, journaled in housing 81, which also has a gear 95 secured thereon. Gear 95 is in mesh with gear 96 secured on the end of shaft 65 opposite bevel gear 66. Thus, as cam member 85 is rotated by the motor, plunger 91, engaged through stud 90 with one of the cam tracks, will move in and out relative to shaft 82 when the distance of the track to shaft 82 changes and at a rate determined by the rate of change of the radial distance of the cam track to the shaft 82. When the cam track is continuous, as shown, the shaft 65, which will rotate in one direction as plunger 91 moves in and in the opposite direction as plunger 91 moves out, will return to its initial angular position on one complete unidirectional rotation of cam member 85, in response to a predetermined unidirectional rotation of motor 80, driving the truing tool through a complete cycle and returning the tool to its initial position.

The truing device of the present invention can be set to true a wide variety of profiles on the grinding wheel. To true a straight profile as shown viewed from above in FIG. 9a, the stop members 43 and 44 are set as shown schematically (viewed from below) in FIG. 9b to hold the arm 38 parallel to the plane P of the wheel (and pointed toward the wheel). The support member 16 will therefore be held in a fixed angular position 90 degrees clockwise (when viewed from above) from the position shown in FIGS. 1 and 2. All rotation imparted to drive shaft 30 will cause a rocking movement of tool carrier 20 about axis B (which remains stationary in plane P of the wheel during the truing operation) in support sleeve 16, and the diamond point 24 will be moved in an arc in a vertical plane parallel to the axis C of the grinding wheel. It will be noted that the profile on the wheel (parallel to the wheel axis) will approximate a straight line (that is, the final form of the wheel will approximate a cylinder). The greater the diameter of the wheel and the greater the distance between diamond point 24 and axis B, the closer the approximation.

Figure 10B:
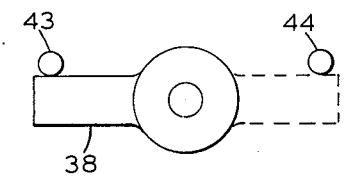

A simple circular profile (FIG. 10a) can be formed on the grinding wheel by locating the stop pins 43 and 44 as shown in FIG. 10b so that arm 38 can move freely through 180 degrees. Starting with the mechanism in the position shown in FIGS. 1 and 2, and providing a cam which will limit motion of drive shaft 30 to 180 degrees, the circular contour shown in FIG. 10a will be formed on the wheel.

Figure 11A:
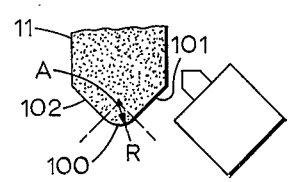
Figure 11B:
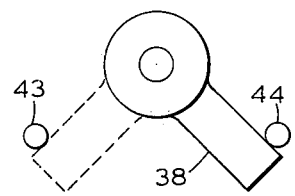

However, it is the more complex profiles for which the present truing mechanism is particularly suitable. With a single power input, the diamond point can move from an arc to a substantially straight profile, as shown in FIG. 11a. With the stop pins 43 and 44 placed 90 degrees apart as shown in FIG. 11b, the diamond point 24 swings through the 90 degree arc 100 about axis A, in response to a rotation of shaft 30 through 90 degrees. The arc 100 will have a radius R established by positioning the point 24 a distance R from the axis A. Further rotation of shaft 30 when arm 38 is engaged with stop pin 44 will cause the tool to swing about axis B, forming the substantially straight profile at 101. Rotation of shaft 30 in the opposite direction when arm 38 is engaged with pin 43 will cause the tool to rock in the opposite direction about axis B to form the substantially straight profile at 102.

Figure 12A:
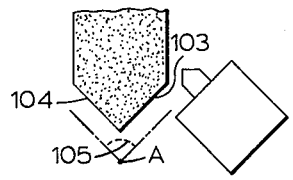
Figure 12B:
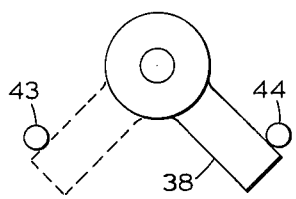

If the truing mechanism and the grinding wheel are positioned relative to each other so that axis A lies outside the wheel, as shown in FIG. 12a, a substantially V shaped profile will be formed when the pins 43 and 44 are spaced 90 degrees apart, as shown n FIG. 12b. With this arrangement the tool will rock about axis B when the arm is engaged with pin 44 to form profile segment 103 and will rock about axis B when the arm is engaged with pin 43 to form profile segment 104. During rotation to arm 38 from pin 44 to pin 43, the tool will swing through arc 105.

All of the described profiles are formed in response to a constant speed rotation of motor 80 through a predetermined angle (of magnitude to rotate cam member 85 through 360 degrees). The truing tool, however, need not rotate at the same speed throughout its cycle. For example, in forming the profile shown in FIG. 12a, it is desirable that the tool swing rapidly through the arc 105 where it is not in cutting contact with the grinding wheel. This result is effected by use of a cam (of the type shown at 86 or 87) but which has a track with a sharp slope (that is, a large change in radial distance from shaft 82 through a small angular span about axis 82) so that a relatively large movement of plunger 91 is effected in the relatively short time the motor drives the cam through that small angular span.

For the truing cycle shown in FIG. 11a, a different sequence of tool speeds is desired since, during rotation about axis A, the tool swings in arc 100 in cutting engagement with the grinding wheel, and a slower tool speed is desired than during rotation about axis A in the truing cycle shown in FIG. 12a. Thus a different cam is desirable. Cam member 85 provides two separate cams which may be alternately selected for the truing cycle.

Thus it will be seen, referring to FIG. 8, that a single input to the truing tool carrier will rotate the tool and support sleeve 16 about axis A until the support sleeve is stopped. With the support sleeve stopped, the tool will rock about axis B. The setting of the stop pins will determine a selected path of the truing tool, and a cam interposed in the drive train between the constant speed motor and input shaft 30 provides selected rates of the truing tool during portions of the cycle. A choice of cams is provided so that two different truing cycles can be performed without changing cam member 85.

What is claimed is:

1. A truing device for a grinding machine comprising in combination:
   (a) a drive member,
   (b) a truing tool carrier mounted for swinging movement about two different axes and operatively connected to the drive member, said truing tool carrier having a truing tool secured therein,
   (c) means sequentially to restrain swinging movement of said carrier about one of said axes and then the other for sequential movement of the truing tool along an arcuate path about said other axis and then along an arcuate path about said one axis,
   (d) and means coordinated with movement of said tool to run said drive member at different rates.

2. A truing device for a grinding machine comprising in combination:
   (a) a support member rotatable about an axis,
   (b) means selectively to arrest rotation of said support member,
   (c) a truing tool carrier carried by the support member and having a truing tool secured therein, said carrier rockable relative to the support member about an axis transverse to the support member axis and normally biased to a predetermined position relative to said support member,
   (d) a drive member engaged with said carrier at a point spaced from both of said axes for sequentially swinging said carrier and the tool carried thereby about said support member axis until rotation of the support member is arrested and then rocking said carrier and the tool carried thereby about said tool carrier axis,
   (e) power operated means to rotate said drive member,
   (f) a pair of cams each operable when rendered effec- control the rate of rotation of said drive member.

3. A truing device for a grinding machine comprising in combination:
   (a) a support member rotatable about an axis,
   (b) means selectively to arrest rotation of said support member,
   (c) a truing tool carrier carried by the support member and having a truing tool secured therein, said carrier rockable relative to the support member about an axis transverse to the support member axis and normally biased to a predetermined position relative to said support member,
   (d) a drive member engaged with said carrier at a point spaced from both of said axes for sequentially swinging said carrier and the tool carried thereby about said support member axis until rotation of the support member is arrested and then rocking said carrier and the tool carried thereby about said tool carrier axis,
   (e) power operated means to rotate said drive member,
   (f) a pair of cams each operable when rendered effective to control the rate of rotation of said drive member, and
   (g) means selectively to render one of said cams effective.

References Cited by the Examiner

UNITED STATES PATENTS

| | | | |
|---|---|---|---|
| 1,245,814 | 11/1917 | Stansbury | 125—11.9 |
| 2,576,589 | 3/1926 | Flaherty | 125—11.7 |
| 1,585,706 | 5/1926 | Hanson | 125—11.9 |
| 1,982,050 | 11/1934 | Gleason et al. | 125—11.9 |
| 2,326,073 | 8/1943 | Seyferth | 125—11 |
| 2,614,552 | 10/1952 | Griffin | 125—11.4 |

ROBERT C. RIORDON, *Primary Examiner.*

HAROLD D. WHITEHEAD, *Examiner.*

UNITED STATES PATENT OFFICE
CERTIFICATE OF CORRECTION

Patent No. 3,220,399                      November 30, 1965

William B. Seidel

It is hereby certified that error appears in the above numbered patent requiring correction and that the said Letters Patent should read as corrected below.

Column 6, line 23, for "a pair of cams each operable when rendered effec-" read -- and a cam rotatable with said drive member to --.

Signed and sealed this 13th day of December 1966.

(SEAL)
Attest:

ERNEST W. SWIDER                                      EDWARD J. BRENNER
Attesting Officer                                            Commissioner of Patents